(12) United States Patent
Chen

(10) Patent No.: US 12,461,437 B2
(45) Date of Patent: Nov. 4, 2025

(54) ILLUMINATION SYSTEM AND PROJECTION APPARATUS

(71) Applicant: Coretronic Corporation, Hsin-Chu (TW)

(72) Inventor: Chang-Hsuan Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 260 days.

(21) Appl. No.: 17/521,868

(22) Filed: Nov. 9, 2021

(65) Prior Publication Data

US 2022/0206377 A1 Jun. 30, 2022

(30) Foreign Application Priority Data

Dec. 25, 2020 (CN) .......................... 202023171572.6

(51) Int. Cl.
*G03B 21/20* (2006.01)
(52) U.S. Cl.
CPC ....... *G03B 21/208* (2013.01); *G03B 21/2013* (2013.01); *G03B 21/2066* (2013.01)
(58) Field of Classification Search
CPC .............. G03B 21/208; G03B 21/2066; G03B 21/2013
USPC .......................................................... 353/94
See application file for complete search history.

(56) References Cited

U.S. PATENT DOCUMENTS

| 8,109,638 | B2* | 2/2012 | Chen ................... | G03B 21/208 |
| | | | | 353/31 |
| 8,388,149 | B2* | 3/2013 | Kaneko ................. | H04N 9/315 |
| | | | | 372/99 |
| 2012/0320355 | A1* | 12/2012 | Maeda ............... | G03B 21/2033 |
| | | | | 362/245 |
| 2014/0375958 | A1* | 12/2014 | Kuwata .............. | G02B 19/0061 |
| | | | | 353/30 |
| 2020/0004038 | A1* | 1/2020 | Chikahisa ............ | H04N 9/3167 |

FOREIGN PATENT DOCUMENTS

| CN | 110082998 A | * 8/2019 | ......... G02B 19/0019 |
| CN | 111025833 | 4/2020 | |

OTHER PUBLICATIONS

Translation of CN 110082998 A (Year: 2025).*

* cited by examiner

*Primary Examiner* — Jerry L Brooks
(74) *Attorney, Agent, or Firm* — JCIPRNET

(57) ABSTRACT

An illumination system configured to provide an illumination beam is provided. The illumination system includes at least two light-combining modules and a light-homogenizing device. One of the at least two light-combining modules includes a light source module and a focusing lens. The light source module is configured to emit an excitation beam, a focusing lens is located between the light source module and the light-homogenizing device, and the focusing lens is located on a path of the excitation beam. The light-homogenizing device includes a light-entrance surface and a light-exit surface. The light source module is disposed on a spherical surface with the light-entrance surface of the light-homogenizing device as a center of a circle, and the excitation beam from the focusing lens is focused on the light-entrance surface of the light-homogenizing device. A projection apparatus is also provided, and uniformity of projection images of the projection apparatus is satisfactory.

24 Claims, 6 Drawing Sheets

ILLUMINATION SYSTEM AND PROJECTION APPARATUS

CROSS-REFERENCE TO RELATED APPLICATION

This application claims the priority benefit of China application serial no. 202023171572.6, filed on Dec. 25, 2020. The entirety of the above-mentioned patent application is hereby incorporated by reference herein and made a part of this specification.

BACKGROUND OF THE INVENTION

1. Field of the Invention

The invention relates to an optical system and an optical apparatus, and particularly relates to an illumination system and a projection apparatus.

2. Description of Related Art

A light-combining module structure of a projection apparatus is mainly divided into a light-emitting diode (LED) light-combining module, a laser beam combining module, and a laser phosphor light-combining module.

In the projection apparatus applying the LED light-combining module and the laser beam combining module, the LEDs or the laser beams of three different colors of red, green, and blue serves as the light source; after being mixed, the mixed light beam is directly guided into a light-homogenizing device and then transmitted to a light valve through an optical device. Finally, an image is formed on a screen by a projection lens.

In the projection apparatus applying the laser phosphor light-combining module, a laser module serves as an excitation beam source. The excitation beam is focused on a phosphor wheel through the optical device, wherein the phosphor wheel has phosphor powder and holes. When the excitation beam passes through the holes of the phosphor wheel, the excitation beam penetrates the optical device and is then guided into the light-homogenizing device. When the excitation beam hits the phosphor powder, a phosphor beam (e.g., a yellow beam) is excited and is then reflected and focused into the light-homogenizing device.

At present, the market share of the laser projection apparatus gradually increases, and the market demand for the projection apparatus with high brightness also increases. In order to achieve higher brightness, it is also necessary to add more laser beam sources in the projection apparatus.

However, plural laser beam sources may encounter issues of difficulties in light combination, complex structure, bulkiness of the light-combining devices, and so on. The plural laser beam sources are often combined in an asymmetric manner, thus resulting in poor uniformity of projection images. Moreover, the light combination method of the laser beam sources cannot be applied by a single-module adjustment mechanism.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

One or more embodiments of the invention provide an illumination system and a projection apparatus, wherein a light path structure thereof may be adjusted to be a symmetrical light-combining structure, so that the illumination system may provide an illumination beam with favorable uniformity, which allows the projection apparatus to achieve favorable display effects.

Other objectives and advantages of the invention may be further understood from the technical features disclosed in the invention.

In order to achieve one, some, or all of the aforementioned objectives or other objectives, an embodiment of the invention provides an illumination system configured to provide an illumination beam. The illumination system includes at least two light-combining modules and a light-homogenizing device. Each of the least two light-combining modules includes a light source module and a focusing lens. The light source module is configured to emit an excitation beam, the focusing lens is located between the light source module and the light-homogenizing device, and the focusing lens is located on a path of excitation beam. The light-homogenizing device includes a light-entrance surface and a light-exit surface. The light source module is disposed on a spherical surface with the light-entrance surface of the light-homogenizing device 120 as a center of the circle, and the excitation beam from the focusing lens is focused on the light-entrance surface of the light-homogenizing device.

An embodiment of the invention provides a projection apparatus that includes an illumination system, a light valve, and a projection lens. The illumination system is configured to provide an illumination beam. The light valve is placed on a light path of the illumination beam to convert the illumination beam into an image beam. The projection lens is disposed on a light path of the image beam and configured to project the image beam out of the projection apparatus. The illumination system includes at least two light-combining modules and a light-homogenizing device. Each of the least two light-combining modules includes a light source module and a focusing lens. The light source module is configured to emit an excitation beam, the focusing lens is located between the light source module and the light-homogenizing device, and the focusing lens is located on a path of the excitation beam. The light-homogenizing device includes a light-entrance surface and a light-exit surface. The light source module is disposed on a spherical surface with the light-entrance surface of the light-homogenizing device as the center of the circle, and the excitation beam from the focusing lens is focused on the light-entrance surface of the light-homogenizing device.

Based on the above, in the illumination system and the projection apparatus provided in one or more embodiments of the invention, the light source modules of the illumination system are arranged on the spherical surface with the light-entrance surface of the light-homogenizing device as the center of the circle, and thus the excitation beam may be simply adjusted to symmetrically enter the light-entrance surface of the light-homogenizing device. Hence, uniformity of projection images of the projection apparatus is satisfactory.

Other objectives, features and advantages of the invention will be further understood from the further technological features disclosed by the embodiments of the invention wherein there are shown and described preferred of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
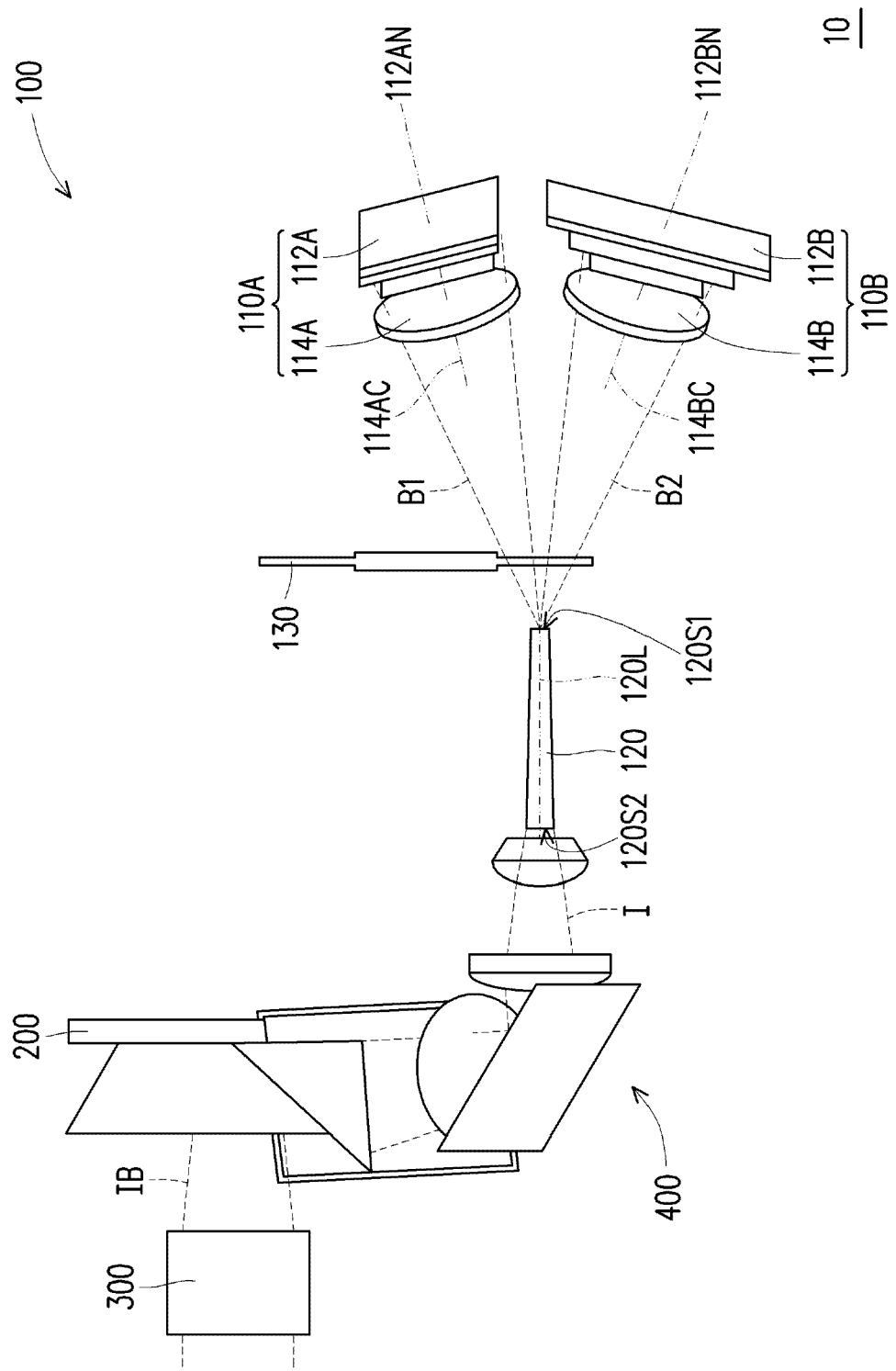
FIG. 1 is a schematic diagram of a projection apparatus according to an embodiment of the invention.
Figure 2:
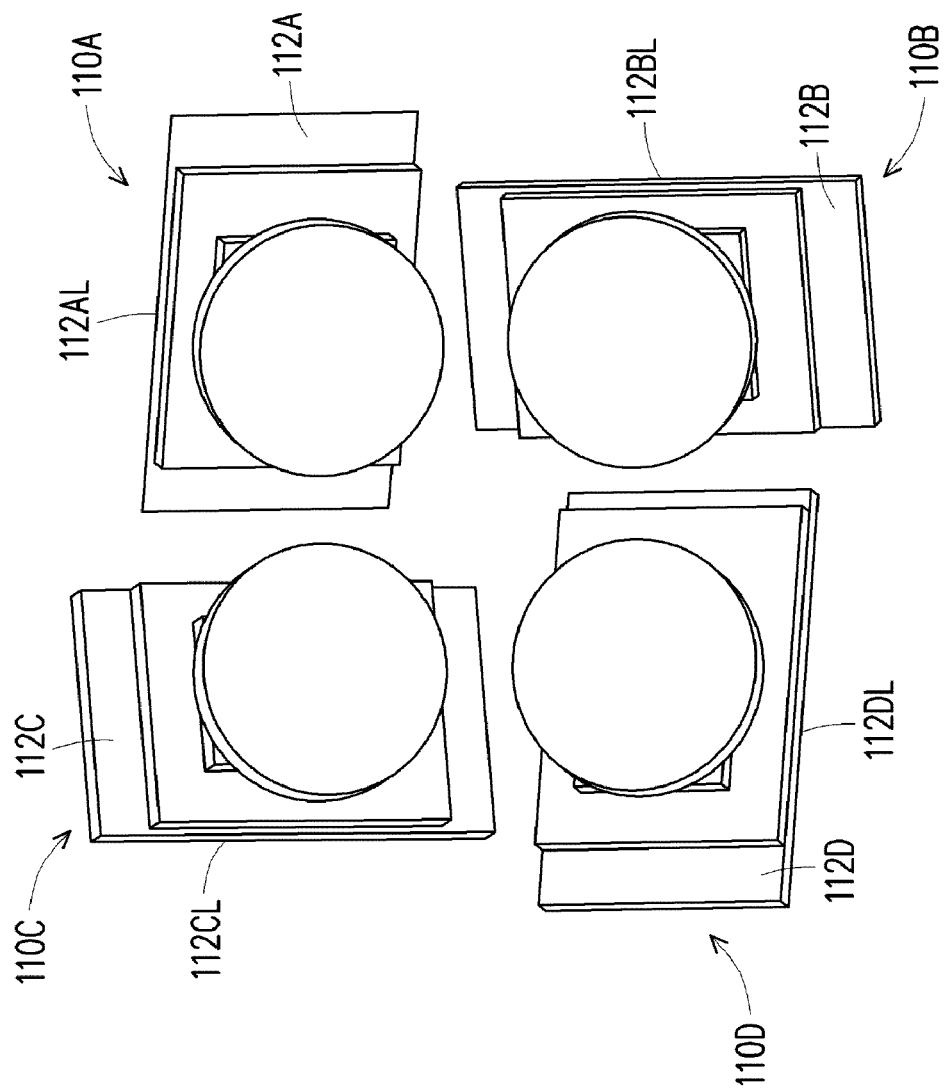
FIG. 2 is a schematic diagram illustrating the light-combining modules in FIG. 1.

FIG. 1 is a schematic diagram of a projection apparatus according to an embodiment of the invention. FIG. 2 is a schematic diagram illustrating the light-combining modules in FIG. 1. With reference to FIG. 1 and FIG. 2, a projection apparatus 10 provided in an embodiment of the invention includes an illumination system 100, a light valve 200, and a projection lens 300. The illumination system 100 is configured to provide an illumination beam I. The light valve 200 is disposed on a light path of the illumination beam I to convert the illumination beam I into an image beam IB. The projection lens 300 is disposed on a light path of the image beam IB to project the image beam IB out of the projection apparatus 10.

In this embodiment, the light valve 200 is a spatial light modulator, e.g., a digital micro-mirror device (DMD), a liquid-crystal-on-silicon (LCOS) panel, a liquid crystal panel (LCD), etc. The projection lens 300 includes, for instance, a combination of one or more optical lenses with diopters. The optical lenses include, for instance, various combinations of non-planar lenses, such as double-concave lenses, double-convex lenses, concave-convex lenses, convex-concave lenses, flat-convex lenses, and flat-concave lenses. The configurations and the types of the light valve 200 and the projection lens 300 are not limited herein.

In this embodiment, the illumination system 100 includes light-combining modules 110A, 110B, 110C, 110D and a light-homogenizing device 120. From the perspective shown in FIG. 1, two light-combining modules 110A and 110B of the light-combining modules 110A, 110B, 110C, and 110D of FIG. 2 are schematically depicted. Each of the light-combining modules 110A, 110B, 110C, and 110D includes a light source module and a focusing lens. As shown in FIG. 2, the light-combining modules 110A, 110B, 110C, and 110D include light source modules 112A, 112B, 112C, and 112D, and focusing lenses 114A, 114B, 114C, and 114D, respectively. As shown in FIG. 1, the light source modules 112A and 112B are configured to emit excitation beams B1 and B2, the focusing lenses 114A and 114B are located between the light source modules 112A and 112B and the light-homogenizing device 120, and the focusing lenses 114A and 114B are (respectively) located on the paths of the excitation beams B1 and B2.

In this embodiment, each of the light source modules 112A, 112B, 112C, and 112D includes a plurality of light-emitting devices (not shown) arranged in an array. The light-emitting devices may be laser diodes (LDs), LEDs, a combination thereof, or other appropriate light-emitting devices, which should not be construed as a limitation herein. The excitation beams emitted by the light-emitting devices may be red beams, green beams, blue beams, or any other color beam. In other words, the colors of the excitation beams B1 and B2 include the colors of the excitation beams emitted by the light-emitting devices. In this embodiment, the number of the light-emitting devices emitting different color beams may be the same or different from each other. For instance, the number of red light-emitting devices with lower luminous efficiency is greater, which is conducive to improvement of color uniformity of the illumination beam I and the image beam IB. In addition, the LDs or the LEDs generating different colors may be arranged in one single light source module, which should not be construed as a limitation herein.

In this embodiment, the light-homogenizing device 120 is, for instance, an integration rod, a lens array, or any other optical device capable of achieving a light-homogenizing effect, which should not be construed as a limitation herein. The light-homogenizing device 120 includes a light-entrance surface 120S1 and a light-exit surface 120S2. In this embodiment, the light-homogenizing device 120 is a taper, and an area occupied by the light-entrance surface 120S1 of the light-homogenizing device 120 is smaller than an area occupied by the light-exit surface 120S2. Here, the light-homogenizing device 120 in form of a taper is conducive to the control of angular distribution of light spots formed when the excitation beams B1 and B2 leave the light-exit surface 120S2, so as to improve contrast effects of projection images of the projection apparatus 10. In an embodiment, the ratio of an area occupied by the light-exit surface 120S2 to an area occupied by the light-entrance surface 120S1 is about 3-10.

In this embodiment, the light source modules 112A and 112B are disposed on a spherical surface with the geometric center of the light-entrance surface 120S1 of the light-homogenizing device 120 as a center of the circle; that is, the surfaces of the light source modules 112A and 112B are parallel to tangent planes of the light source modules 112A and 112B on the spherical surface, and the excitation beams B1 and B2 from the focusing lenses 114A and 114B are focused on the light-entrance surface 120S1 of the light-homogenizing device 120.

In this embodiment, the ratio of a distance from the light source modules 112A and 112B of any two light-combining modules 110A and 110B to the light-entrance surface 120S1 of the light-homogenizing device 120 falls within a range from 0.9 to 1.1. In an embodiment, the distance from each of the light source modules 112A and 112B of the light-combining modules 110A and 110B to the light-entrance surface 120S1 of the light-homogenizing device 120 is equal.

In this embodiment, the number of the light source modules 112A and 112B of the light-combining module 110A and 110B is an even number, and two of the light source modules 112A and 112B are arranged to be symmetrical to a long axis 120L of the light-homogenizing device 120.

As shown in FIG. 2, in this embodiment, each of the light source modules 112A, 112B, 112C, and 112D of the light-combining modules 110A, 110B, 110C, and 110D is a rectangle, and long sides 112AL, 112BL, 112CL, and 112DL of each of the light source modules 112A, 112B, 112C, and 112D are perpendicular to the long sides 112AL, 112BL, 112CL, and 112DL of the adjacent light source modules. In other words, when the long sides 112AL, 112BL, 112CL, 112DL of the light source modules 112A, 112B, 112C, and 112D and the adjacent light source modules are arranged to be interlaced, color uniformity of the illumination beam I or the image beam IB may be improved, and the interlaced arrangement further reduces the volume of the illumination system 100 or the projection apparatus 10.

As shown in FIG. 1, in this embodiment, central axes 114AC and 114BC of the focusing lenses 114A and 114B are (respectively) parallel to normal lines 112AN and 112BN of the light source modules 112A and 112B.

In an embodiment, the central axes 114AC and 114BC of the focusing lenses 114A and 114B and the central axes 112AN and 112BN of the light source modules 112A and 112B are (respectively) parallel but do not coincide with each other. In other words, the focusing lenses 114A and 114B may be designed to be independently adjusted, so that the focusing lenses 114A and 114B may move horizontally in a direction perpendicular to the central axes 112AN and 112BN of the light source modules 112A and 112B. The focusing lens 114A is taken as an example. The focusing lens 114A may move in x-axis and y-axis directions of a horizontal plane by adjusting a mechanism (not shown), wherein the horizontal plane has a normal line, and the normal line is parallel to the central axis 112AN of the light source module 112A. The distribution of light spots of the excitation beams B1 and B2 on the light-exit surface 120S2 of the light-homogenizing device 120 is changed together with the movement of the focusing lenses 114A and 114B. The centers of the light spots of the excitation beams B1 and B2 on the light-exit surface 120S2 of the light-homogenizing device 120 may be substantially coincided with the center of the light-exit surface 120S2 by adjusting the central axes 114AC and 114BC of the focusing lenses 114A and 114B.

Therefore, the illumination system 100 and the projection apparatus 10 provided in the embodiment of the invention may exhibit improved effects, and the light combination method of a plurality of light source modules may be applied by the single-module adjustment mechanism.

In this embodiment, the illumination system 100 further includes a diffuser device 130. The diffuser device 130 may be a diffuser wheel. The diffuser device 130 is located between the light-combining modules 110A and 110B and the light-homogenizing device 120 and is located on the light paths of the excitation beams B1 and B2. The diffuser device 130 homogenizes the passing excitation beams B1 and B2, which is conducive to the improvement of uneven light spot distribution of the excitation beams B1 and B2. Therefore, the illumination system 100 and the projection apparatus 10 may achieve better effects.

In this embodiment, the projection apparatus 10 further includes an optical device group 400. The optical device group 400 is configured to transmit the illumination beam I to the light valve 200 or to transmit the image beam IB to the projection lens 300. The optical device group 400 may include a lens, a reflector, a total internal reflection (TIR) prism, or any other optical device configured to guide light beams.

In view of the above, in the illumination system 100 and the projection apparatus 10 provided in an embodiment of the invention, since the illumination system 100 includes at least two light-combining modules 110A and 110B, the market demand for the projection apparatus with high brightness may be satisfied. Furthermore, the light source modules 112A and 112B are disposed on a spherical surface with the light-entrance surface 120S1 of the light-homogenizing device 120 as a center of the circle, so that the excitation beams B1 and B2 may be adjusted to symmetrically enter the light-entrance surface 120S1 of the light-homogenizing device 120. As such, the projection images of the projection apparatus 10 may have the improved uniformity. Furthermore, each of the light-combining modules 110A and 110B may merely be equipped with one of the focusing lenses 114A and 114B, and other optical devices may be omitted, so that attenuation of the optical brightness of the illumination system 100 and the projection apparatus 10 may be slowed down at lower costs. In addition, the focusing lenses 114A and 114B allow the excitation beams B1 and B2 to focus on the light-entrance surface 120S1 of the light-homogenizing device 120, so that the light concentration efficiency of the illumination system 100 or the projection apparatus 10 is increased, and the light energy utilization rate is further increased.

Figure 3:
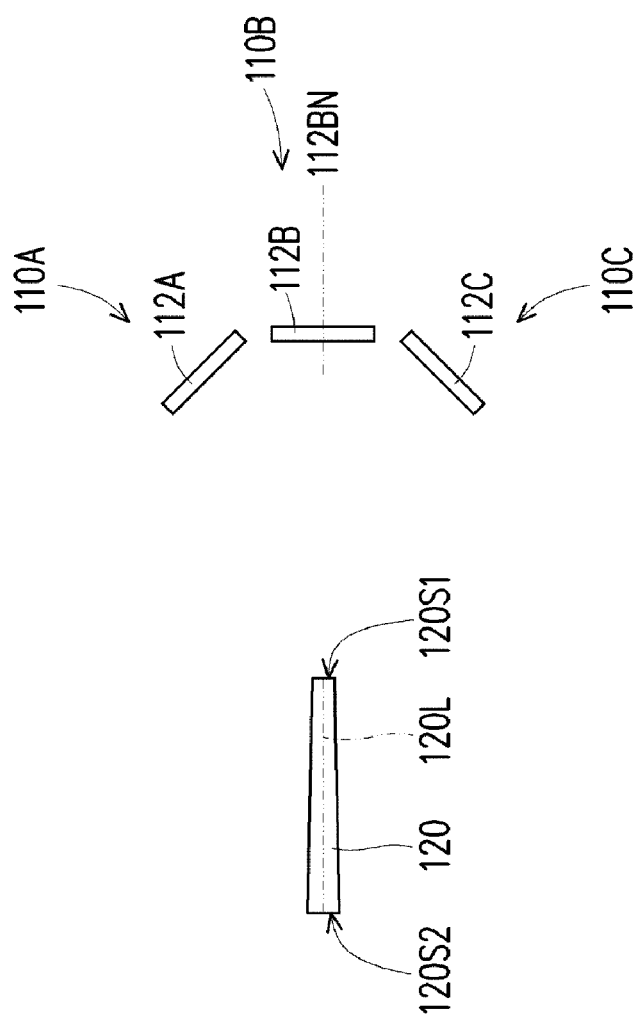
FIG. 3 is a schematic partial diagram of an illumination system according to another embodiment of the invention.

FIG. 3 is a schematic partial diagram of an illumination system according to another embodiment of the invention. For better illustration, the relative positions of the light-combining modules 110A, 110B, and 110C and the light-homogenizing device 120 in the illumination system are schematically depicted in FIG. 3, and other devices are omitted. With reference to FIG. 3, the illumination system depicted in FIG. 3 is similar to the illumination system 100 depicted in FIG. 1, while the main difference is: in the illumination system depicted in FIG. 3, the number of the light source modules 112A, 112B, and 112C of the light-combining modules 110A, 110B, and 110C is an odd number, and the normal line 112BN of one of the light source modules 112A, 112B, and 112C is parallel to the long axis 120L of the light-homogenizing device 120. The normal line 112BN of the light source module 112B is parallel to the long axis 120L of the light-homogenizing device 120, so that the other light source modules 112A and 112C may be arranged symmetrically with respect to the normal line 112BN as the center. Therefore, the light path structure may be easily adjusted to be a symmetrical light-combining structure.

Figure 4:
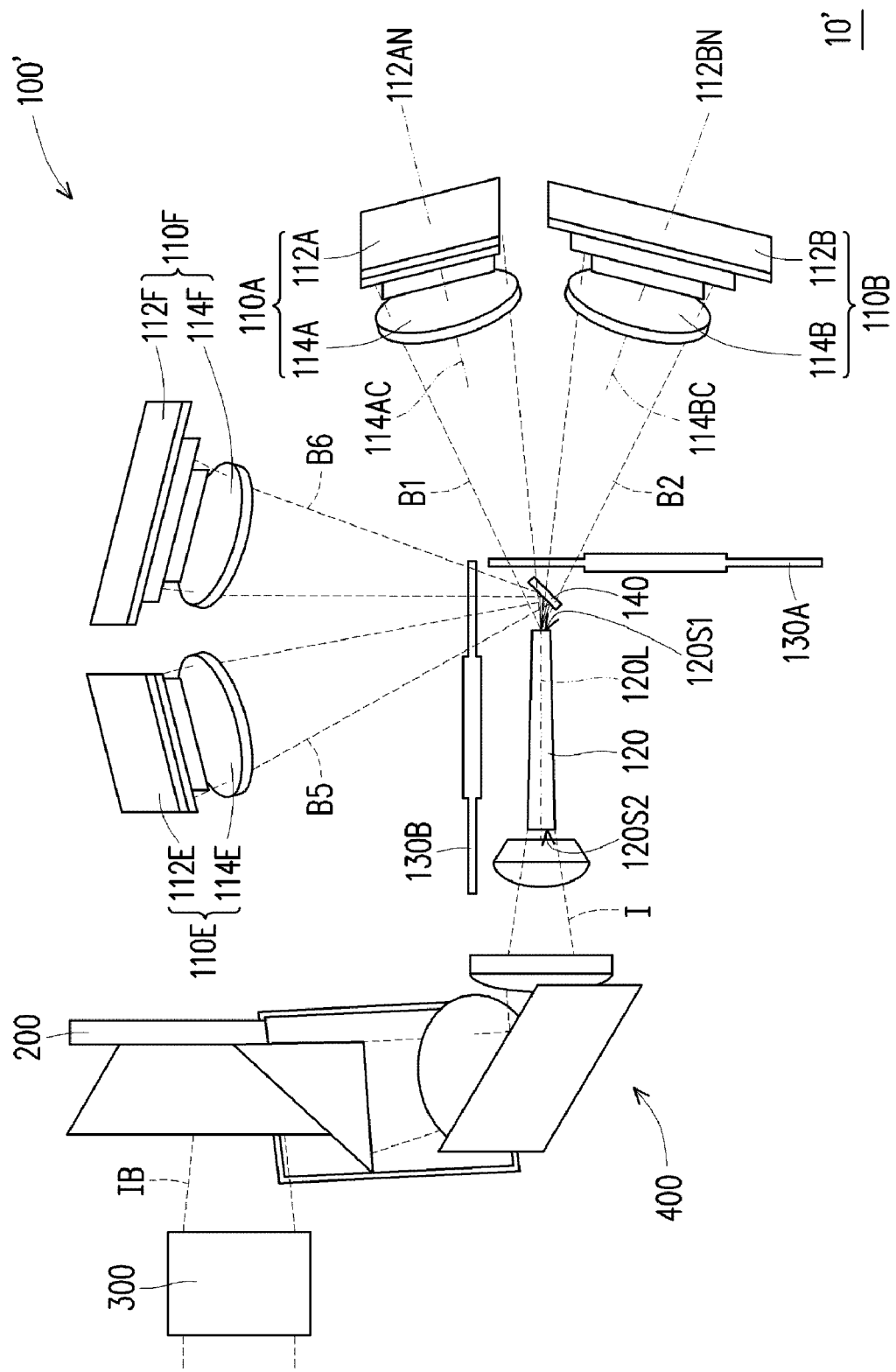
FIG. 4 is a schematic diagram of a projection apparatus according to another embodiment of the invention.

FIG. 4 is a schematic diagram of a projection apparatus according to another embodiment of the invention. With reference to FIG. 4, the illumination system 100' and the projection apparatus 10' depicted in FIG. 4 are similar to the illumination system 100 and the projection apparatus 10 depicted in FIG. 1, while the main difference is: the illumination system 100' and the projection apparatus 10' further include a reflecting device 140. In this embodiment, the reflecting device 140 may be a reflecting mirror or a reflecting prism. The reflecting device 140 is disposed between one of the light-combining modules 110A, 110B, 110E, and 110F and the light-homogenizing device 120, and the reflecting device 140 is configured to change a transmission direction of the excitation beams B5 and B6. As exemplarily shown in FIG. 4, the reflecting device 140 is disposed between the light-combining modules 110A and 110B and the light-homogenizing device 120, and the reflecting device 140 is disposed on the light paths of the excitation beams B5 and B6.

In this embodiment, the light-combining modules 110E and 110F respectively include light source modules 112E and 112F and focusing lenses 114E and 114F. The light source modules 112E and 112F respectively emit excitation beams B5 and B6, wherein the excitation beams B5 and B6 respectively penetrate the focusing lenses 114E and 114F and are then reflected by the reflecting device 140 to the light-homogenizing device 120.

In this embodiment, the illumination system 100' and the projection apparatus 10' further include at least two diffuser devices 130A and 130B. The diffuser devices 130A and 130B respectively correspond to the light-combining modules 110A, 110B, 110E, and 110F, wherein one of the diffuser devices 130A and 130B is located between one of the light-combining modules 110A, 110B, 110E, and 110F and the light-homogenizing device 120 and located on the light paths of the excitation beams B1, B2, B5, and B6. As exemplarily shown in FIG. 4, the diffuser device 130A corresponds to the light-combining modules 110A and 110B, wherein the diffuser device 130A is located between the light-combining modules 110A and 110B and the light-homogenizing device 120 and is located on the light paths of the excitation beams B1 and B2. The diffuser device 130B corresponds to the light-combining modules 110E and 110F, wherein the diffuser device 130B is located between the light-combining modules 110E and 110F and the reflecting device 140 and located on the light paths of the excitation beams B5 and B6. The effects that may be achieved by the diffuser devices 130A and 130B depicted in FIG. 4 are similar to those of the diffuser device 130 depicted in FIG. 1, and therefore no further explanation is provided hereinafter.

In an embodiment, the distance from one of the diffuser devices 130A and 130B to the light-entrance surface 120S1 of the light-homogenizing device 120 is less than or equal to 10 mm. The shorter the distance from the diffuser devices 130A and 130B to the light-entrance surface 120S1 of the light-homogenizing device 120 is, the greater the improvement of the uneven distribution of light spots of the excitation beams B1, B2, B5, and B6 emitted from the light-exit surface 120S2 of the light-homogenizing device 120.

Figure 5A:
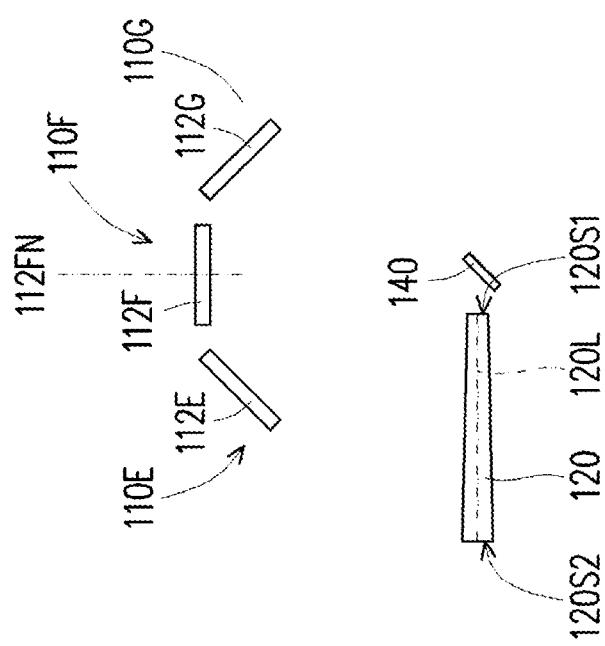
FIG. 5A is a schematic partial diagram of an illumination system according to still another embodiment of the invention.

FIG. 5A is a schematic partial diagram of an illumination system according to still another embodiment of the invention. For better illustration, the relative positions of the light-combining modules 110E, 110F, and 110G and the light-homogenizing device 120 in the illumination system in FIG. 5A are schematically illustrated, and other devices are omitted. With reference to FIG. 5A, the illumination system depicted in FIG. 5A is similar to the illumination system 100' depicted in FIG. 4, while the main difference is: the normal lines of the light source modules 112E, 112F, and 112G of the light-combining modules 110E, 110F, and 110G depicted in FIG. 5A are perpendicular to the long axis 120L of the light-homogenizing device 120. As exemplarily shown in FIG. 5A, the normal line 112FN of the light source module 112F of the light-combining module 110F is perpendicular to the long axis 120L of the light-homogenizing device 120.

Figure 5B:
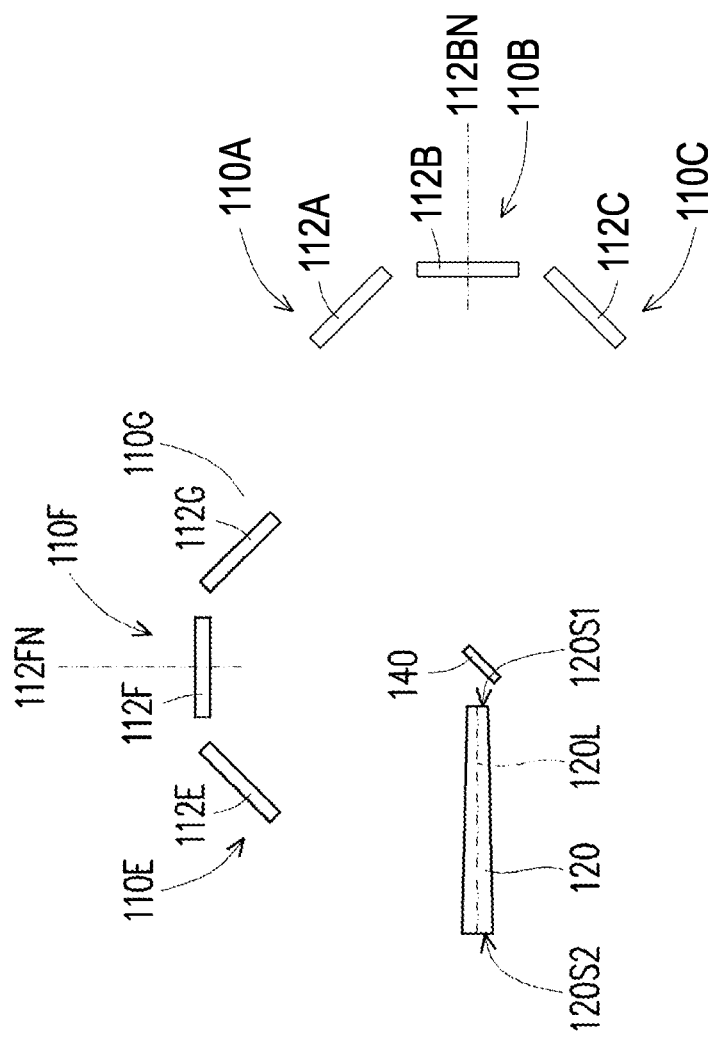
FIG. 5B is a schematic partial diagram of an illumination system according to still another embodiment of the invention.

To be specific, in other embodiments, the illumination system in FIG. 5A may be equipped with other light-combining modules on a side different from the positions of the light-combining modules 110E, 110F, and 110G; for instance, as shown in FIG. 5B, the light-combining modules 110A, 110B, and 110C depicted in FIG. 3 may be arranged in the illumination system depicted in FIG. 5A. At this time, the number of the light-combining modules is an even number, and the normal line of one of the light source modules is parallel to the long axis 120L of the light-homogenizing device 120. For instance, the normal line 112BN of the light source module 112B depicted in FIG. 3 (also in FIG. 5B) is parallel to the long axis 120L of the light-homogenizing device 120.

According to one or more embodiments of the invention, the light source module of the light-combining module may be arranged in different ways according to different designs. For instance, the normal line of each of the light source modules is neither parallel nor perpendicular to the long axis 120L of the light-homogenizing device 120.

To sum up, in the illumination system and the projection apparatus provided in one or more embodiments of the invention, the illumination system includes at least two light-combining modules, which may thus meet the market demand for the projection apparatus with high brightness. Besides, the light source module is disposed on a spherical surface with the light-entrance surface of the light-homogenizing device as the center of the circle, so that the excitation beam may be adjusted to symmetrically enter the light-entrance surface of the light-homogenizing device. As a result, uniformity of the projection images of the projection apparatus may be improved.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system configured to provide an illumination beam and comprising a plurality of light-combining modules and a light-homogenizing device,
    wherein each of the plurality of light-combining modules comprises a light source module and a focusing lens, the light source module is configured to emit an excitation beam, the focusing lens is located between the light source module and the light-homogenizing device, the focusing lens is located on a path of the excitation beam, and
    the light-homogenizing device comprises a light-entrance surface and a light-exit surface, wherein
    the light source modules of at least two of the plurality of light-combining modules are located on a spherical surface, a spherical center of the spherical surface is located at the light-entrance surface of the light-homogenizing device, light-emitting surfaces of the light source modules of at least two of the plurality of light-combining modules are parallel to at least two tangent planes of the spherical surface correspondingly, and the excitation beam from the focusing lens is focused on the light-entrance surface of the light-homogenizing device;
    wherein each of the plurality of light source modules of the plurality of light-combining modules has the light-emitting surface and a rectangular surface parallel to each other, the rectangular surface is formed by two long sides and two short sides, each of the two long sides is perpendicular to the two short sides, wherein one of the two long sides of one of the plurality of light source modules is perpendicular to one of the two long sides of another one of the plurality of light source modules adjacent to the one of the plurality of light source modules.

2. The illumination system according to claim 1, wherein the light source modules comprise a plurality of light-emitting devices arranged in an array.

3. The illumination system according to claim 1, wherein a number of plurality of light source modules of the plurality of light-combining modules is an odd number, and a normal line of one of the plurality of light source modules is parallel to a long axis of the light-homogenizing device.

4. The illumination system according to claim 1, wherein a number of plurality of light source modules of the plurality of light-combining modules is an even number, and the plurality of light source modules are arranged to be symmetrical to a long axis of the light-homogenizing device.

5. The illumination system according to claim 1, further comprising:
    a reflecting device, disposed between one of the plurality of light-combining modules and the light-homogenizing device and configured to change a transmission direction of the excitation beam.

6. The illumination system according to claim 5, wherein a normal line of the light source module of another one of the plurality of light-combining modules is perpendicular to a long axis of the light-homogenizing device.

7. The illumination system according to claim 1, wherein the light-homogenizing device is a taper, and an area occupied by the light-entrance surface of the light-homogenizing device is smaller than an area occupied by the light-exit surface opposite to the light-entrance surface.

8. The illumination system according to claim 1, further comprising:
    a plurality of diffuser devices, respectively corresponding to the plurality of light-combining modules, wherein one of the plurality of diffuser devices is located between one of the plurality of light-combining modules and the light-homogenizing device and located on a light path of the excitation beam.

9. The illumination system according to claim 8, wherein a distance from one of the plurality of diffuser devices to the light-entrance surface of the light-homogenizing device is less than or equal to 10 mm.

10. The illumination system according to claim 1, wherein a central axis of the focusing lens is parallel to a normal line of the corresponding light source module.

11. The illumination system according to claim 1, wherein a central axis of the focusing lens and a central axis of the corresponding light source module are parallel but do not coincide with each other.

12. The illumination system according to claim 1, wherein a distance from each of the plurality of light source modules of the plurality of light-combining modules to the light-entrance surface of the light-homogenizing device is equal.

13. A projection apparatus, comprising: an illumination system, a light valve, and a projection lens, wherein the illumination system is configured to provide an illumination beam, the light valve is disposed on a light path of the illumination beam to convert the illumination beam into an image beam, and the projection lens is disposed on a light path of the image beam and configured to project the image beam out of the projection apparatus, wherein the illumination system comprises a plurality of light-combining modules and a light-homogenizing device,
    wherein each of the plurality of light-combining modules comprises a light source module and a focusing lens, the light source module is configured to emit an excitation beam, the focusing lens is located between the light source module and the light-homogenizing device, the focusing lens is located on a path of the excitation beam, and the light-homogenizing device comprises a light-entrance surface and a light-exit surface, wherein the light source modules of at least two of the plurality of light-combining modules are located on a spherical surface, a spherical center of the spherical surface is located at the light-entrance surface of the light-homogenizing device, light-emitting surfaces of the light source modules of at least two of the plurality of light-combining modules are parallel to at least two tangent planes of the spherical surface correspondingly, and the excitation beam from the focusing lens is focused on the light-entrance surface of the light-homogenizing device;

wherein each of the plurality of light source modules of the plurality of light-combining modules has the light-emitting surface and a rectangular surface parallel to each other, the rectangular surface is formed by two long sides and two short sides, each of the two long sides is perpendicular to the two short sides, wherein one of the two long sides of one of the plurality of light source modules is perpendicular to one of the two long sides of another one of the plurality of light source modules adjacent to the one of the plurality of light source modules.

14. The projection apparatus according to claim 13, wherein the light source modules comprise a plurality of light-emitting devices arranged in an array.

15. The projection apparatus according to claim 13, wherein a number of plurality of light source modules of the plurality of light-combining modules is an odd number, and a normal line of the plurality of light source modules is parallel to a long axis of the light-homogenizing device.

16. The projection apparatus according to claim 13, wherein a number of plurality of light source modules of the plurality of light-combining modules is an even number, and the plurality of light source modules are arranged to be symmetrical to a long axis of the light-homogenizing device.

17. The projection apparatus according to claim 13, further comprising:
a reflecting device, disposed between one of the plurality of light-combining modules and the light-homogenizing device and configured to change a transmission direction of the excitation beam.

18. The projection apparatus according to claim 17, wherein a normal line of the light source module of another one of the plurality of light-combining modules is perpendicular to a long axis of the light-homogenizing device.

19. The projection apparatus of claim 13, wherein the light-homogenizing device is a taper, and an area occupied by the light-entrance surface of the light-homogenizing device is smaller than an area occupied by the light-exit surface opposite to the light-entrance surface.

20. The projection apparatus according to claim 13, further comprising:
a plurality of diffuser devices, respectively corresponding to the plurality of light-combining modules, wherein one of the plurality of diffuser devices is located between one of the plurality of light-combining modules and the light-homogenizing device and located on the light path of the excitation beam.

21. The projection apparatus according to claim 20, wherein a distance from one of the plurality of diffuser devices to the light-entrance surface of the light-homogenizing device is less than or equal to 10 mm.

22. The projection apparatus according to claim 13, wherein a central axis of the focusing lens is parallel to a normal line of the corresponding light source module.

23. The projection apparatus according to claim 13, wherein a central axis of the focusing lens and a central axis of the corresponding light source module are parallel but do not coincide with each other.

24. The projection apparatus according to claim 13, wherein a distance from each of the plurality of light source modules of the plurality of light-combining modules to the light-entrance surface of the light-homogenizing device is equal.

* * * * *